(12) United States Patent
Sailer et al.

(10) Patent No.: US 11,227,348 B2
(45) Date of Patent: Jan. 18, 2022

(54) MOBILE MODULAR DINING

(71) Applicant: Honda Motor Co., Ltd., Tokyo (JP)

(72) Inventors: Michael T. Sailer, Whittier, CA (US); Nathan G Brown, Long Beach, CA (US); Annika E. Nordlund-Swenson, Seattle, WA (US); Katie C. Wallace, Long Beach, CA (US); Panagiotis Giannopoulos, Athens (GR)

(73) Assignee: Honda Motor Co., Ltd., Tokyo (JP)

( * ) Notice: Subject to any disclaimer, the term of this patent is extended or adjusted under 35 U.S.C. 154(b) by 480 days.

(21) Appl. No.: 16/369,252

(22) Filed: Mar. 29, 2019

(65) Prior Publication Data

US 2020/0311837 A1 Oct. 1, 2020

(51) Int. Cl.
*G06Q 50/12* (2012.01)
*G01C 21/34* (2006.01)
*G06Q 10/04* (2012.01)

(52) U.S. Cl.
CPC ......... *G06Q 50/12* (2013.01); *G01C 21/3438* (2013.01); *G06Q 10/047* (2013.01)

(58) Field of Classification Search
CPC ... G06Q 50/12; G06Q 10/047; G01C 21/3438
USPC ........................................................ 705/15
See application file for complete search history.

(56) References Cited

U.S. PATENT DOCUMENTS

| | | | |
|---|---|---|---|
| 3,420,566 A * | 1/1969 | Obra | B60P 3/32 296/166 |
| 6,649,848 B2 | 11/2003 | Kriger | |
| 7,803,111 B2 | 9/2010 | Kriger | |
| 9,898,776 B2 | 2/2018 | Apsley et al. | |
| 10,520,942 B1 * | 12/2019 | Flachsbart | G05D 1/0297 |
| 2011/0247531 A1 * | 10/2011 | Sunderland | A47B 23/06 108/145 |
| 2013/0325526 A1 * | 12/2013 | Tyler | G06Q 10/02 705/5 |
| 2015/0132425 A1 | 5/2015 | Lacaze et al. | |
| 2017/0106600 A1 | 4/2017 | Sostek | |
| 2017/0341795 A1 | 11/2017 | Colson et al. | |
| 2018/0025446 A1 * | 1/2018 | Lee | A23L 33/30 705/15 |
| 2020/0154949 A1 * | 5/2020 | Klein | B60P 3/0257 |
| 2021/0139094 A1 * | 5/2021 | Matsutani | G05B 19/4155 |

FOREIGN PATENT DOCUMENTS

| | | | |
|---|---|---|---|
| CN | 203583932 U | * | 5/2014 |
| CN | 204326594 U | * | 5/2015 |
| WO | WO2017018745 A1 | | 2/2017 |
| WO | WO2017018746 A1 | | 2/2017 |

OTHER PUBLICATIONS

"Restaurant Table Management to Reduce Customer Waiting Times" Published by Johye Hwang in 2008 (Year: 2008).*

* cited by examiner

*Primary Examiner* — Zeina Elchanti
(74) *Attorney, Agent, or Firm* — American Honda Motor Co., Inc.; Aaron Fong

(57) ABSTRACT

The systems and methods provided herein are directed to a system of modular mobile autonomous vehicles that can selectively connect in order to combine dining experiences of different passengers. Passenger preferences, trip details, and food logistics can each be factors in determining optimal matches for combined dining.

10 Claims, 15 Drawing Sheets

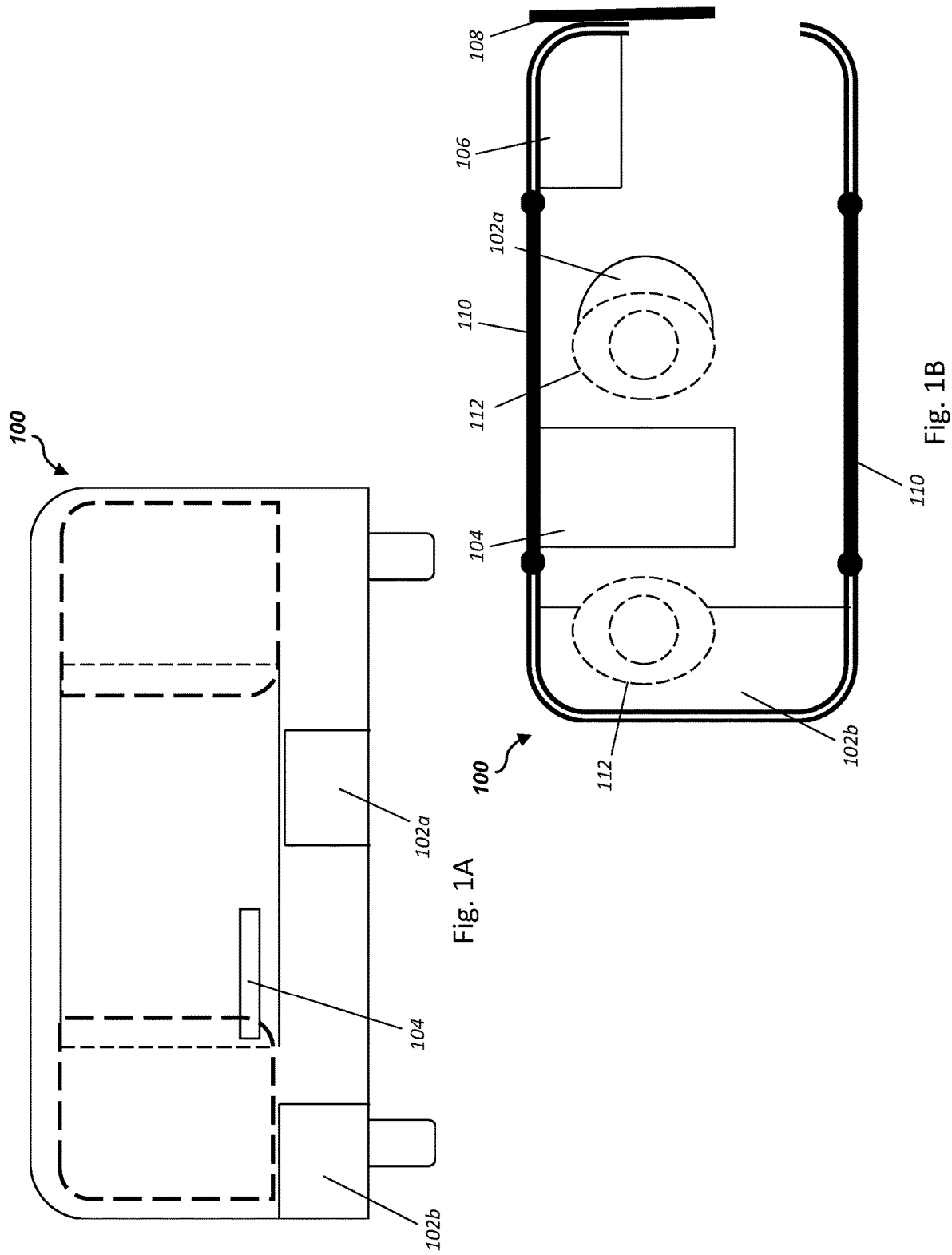

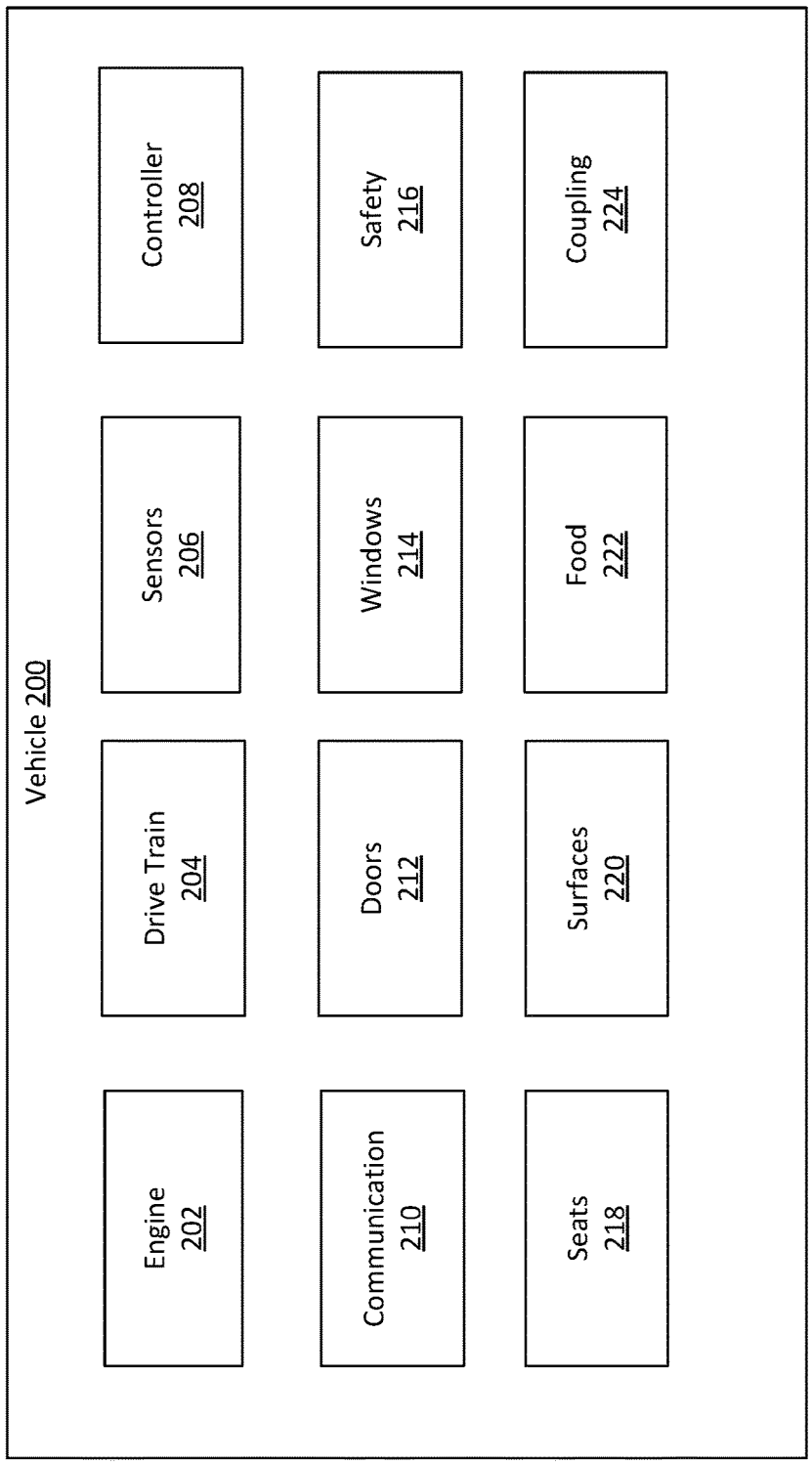

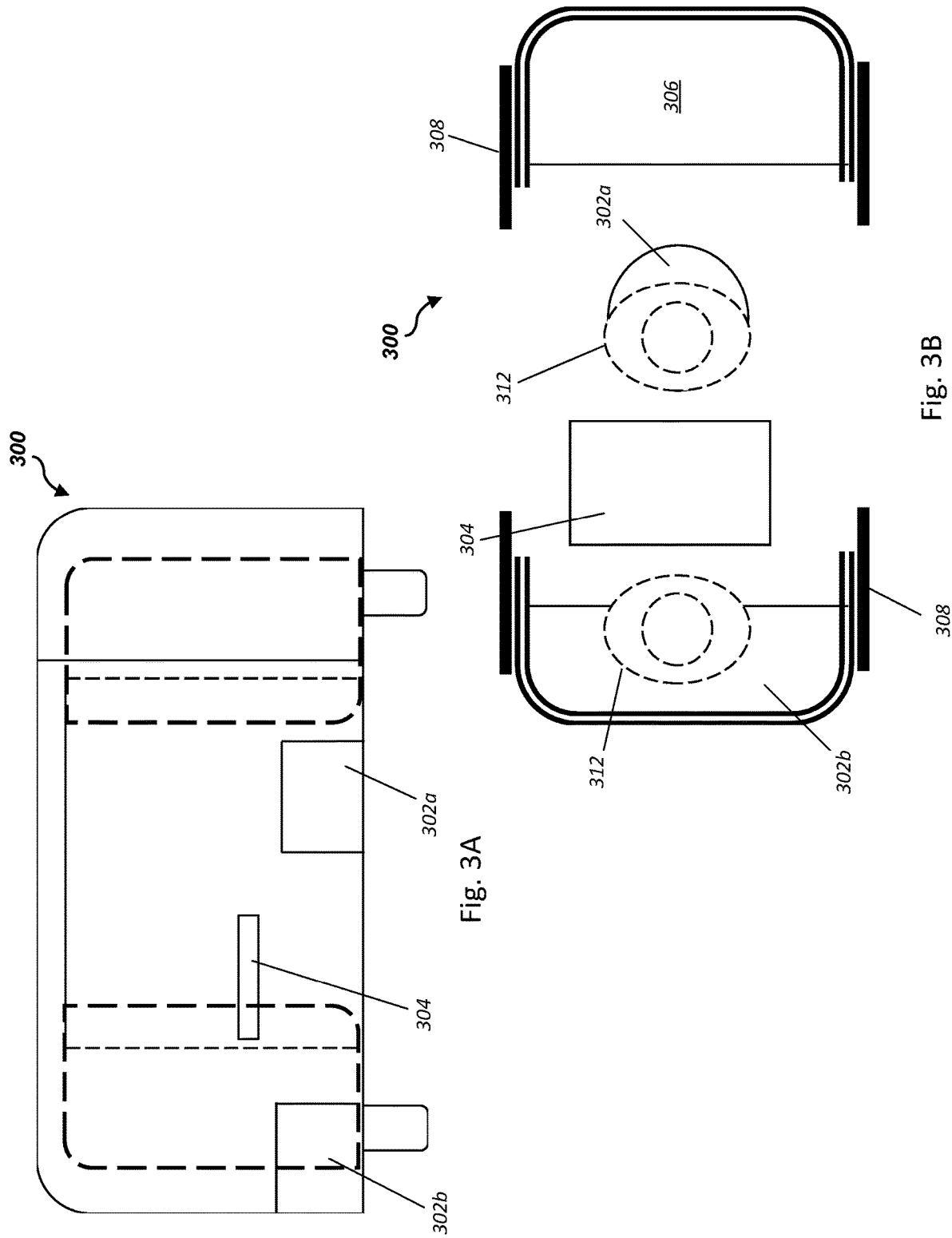

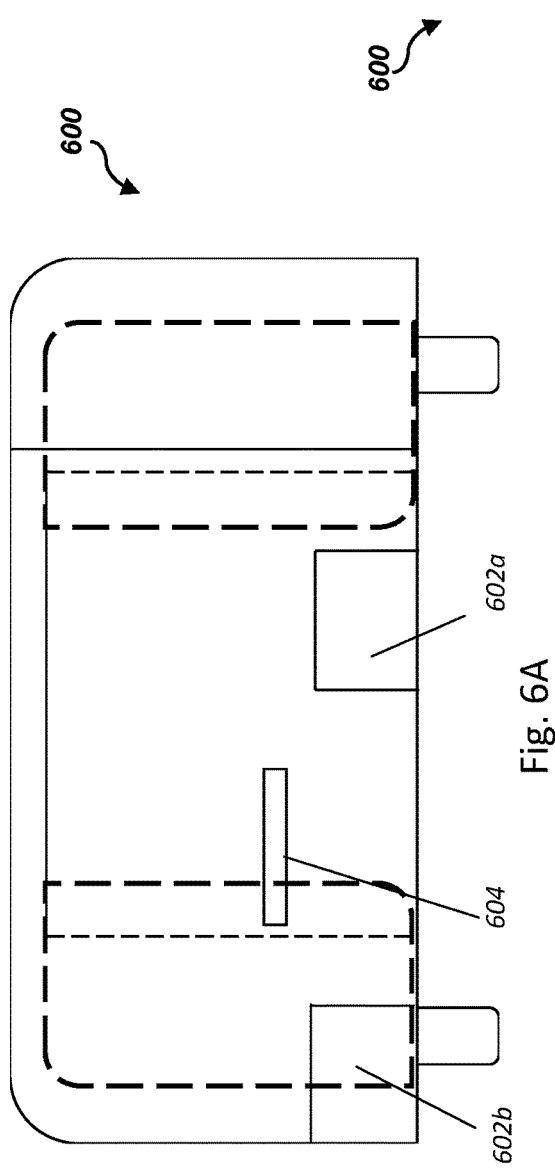
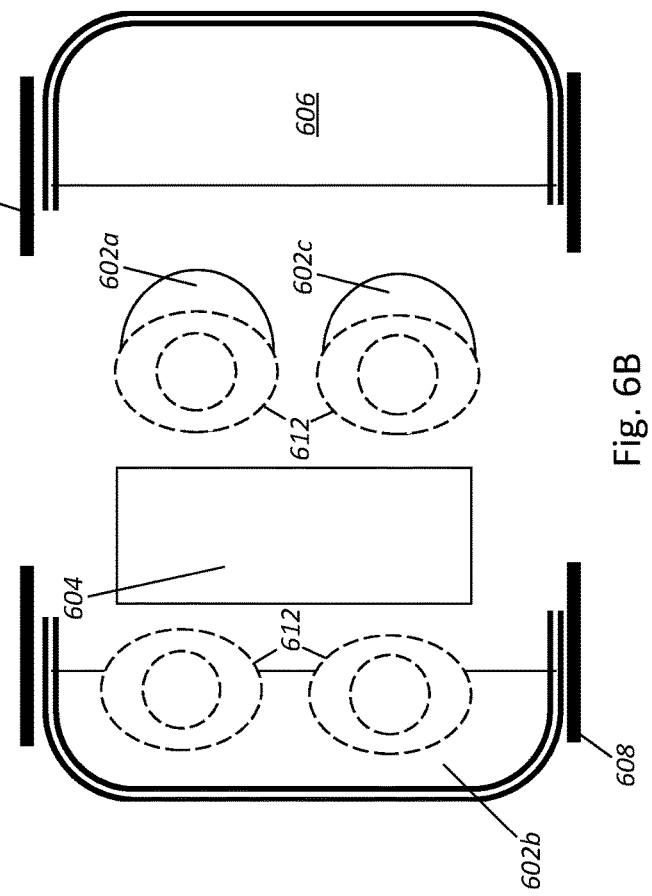
Fig. 6A
Fig. 6B

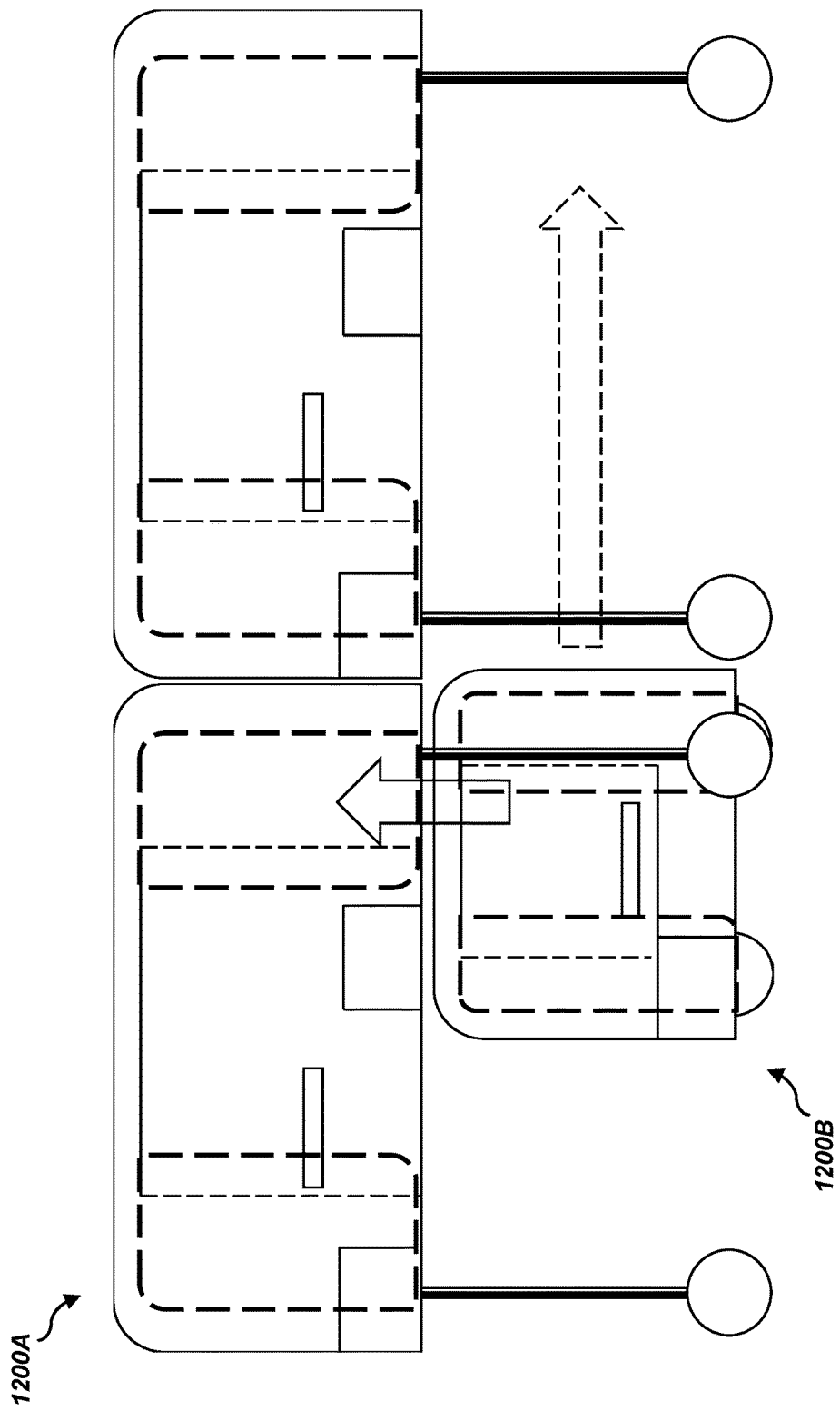

MOBILE MODULAR DINING

BACKGROUND AND BRIEF DESCRIPTION

The advent of autonomous vehicles dramatically changes the in-car experience. In an autonomous vehicle, people can divert attention to activities that were previously considered too distracting for safe operation of the vehicle by a driver, allowing them to restructure how they spend their travel time. One such activity is dining.

The present disclosure describes methods and apparatus for matching passengers in multiple autonomous vehicles in order to create a communal dining experience. Embodiments are described by which modular vehicles and/or vehicle compartments can be combined to optimize the shared space.

In some aspects of an exemplary embodiment, a computer-implemented method includes identifying a first vehicle including a first dining experience; identifying a second vehicle including a second dining experience; and controlling at least one of the first and second vehicles to attach the first and second vehicles and combine the first and second dining experiences.

In one embodiment, identifying the first and second vehicle can include determining the compatibility of the first dining experience with the second dining experience. A start and/or end times of both dining experiences can be compared. The start times of the first and second dining experiences may be within a predetermined range.

In some aspects of the foregoing embodiment, determining the compatibility of the dining experiences can include comparing a travel route of the first vehicle with a travel route of the second vehicle. An overlap portion between the two routes can be determined. The overlap portion may be determined based on modifying at least one of the travel routs to increase its overlap with the other travel route.

In some aspects of the foregoing embodiment, determining the compatibility of the dining experiences can include comparing a food selection of the first dining experience with a food selection of the second dining experience. The food selections may share ingredients and/or food preparation.

In some aspects of the foregoing embodiment, determining the compatibility of the dining experiences can include identifying a personal connection between one or more individuals associated with the first dining experience and one or more individuals associated with the second dining experience.

In some aspects of the foregoing embodiment, determining the compatibility of the dining experiences can include comparing an entertainment selection of the first dining experience with an entertainment selection of the second dining experience.

In some aspects of an exemplary embodiment, a mobile modular dining system includes a first autonomous vehicle comprising a first passenger dining compartment and a second autonomous vehicle comprising a second passenger dining compartment. The first and second autonomous vehicles are configured to connect to form a combined passenger dining compartment from the first and second passenger dining compartments.

In some embodiments, a third autonomous vehicle having a third dining compartment can be configured to connect to form a larger combined passenger dining compartment with the first, second, and third passenger dining compartments.

In some embodiments, an autonomous vehicle having a food preparation area can be configured to connect to join the food preparation area with one of the above-described combined passenger dining compartments.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 1A shows a cut-away side view of a modular vehicle in accordance with one aspect of the disclosure;

FIG. 1B shows a top-down plan view of the modular vehicle of FIG. 1A;

FIG. 2 is a schematic of vehicle components in accordance with one aspect of the disclosure;

FIG. 3A shows a cut-away side view of a modular vehicle in accordance with one aspect of the disclosure;

FIG. 3B shows a top-down plan view of the modular vehicle of FIG. 3A;

FIG. 6A shows a cut-away side view of a modular vehicle in accordance with one aspect of the disclosure;

FIG. 6B shows a top-down plan view of the modular vehicle of FIG. 6A;

FIG. 12 illustrates by means of a cutaway side view the movement of a food service vehicle between connected modular passenger vehicles in accordance with one aspect of the disclosure.

DESCRIPTION OF THE DISCLOSURE

Figure 1C:
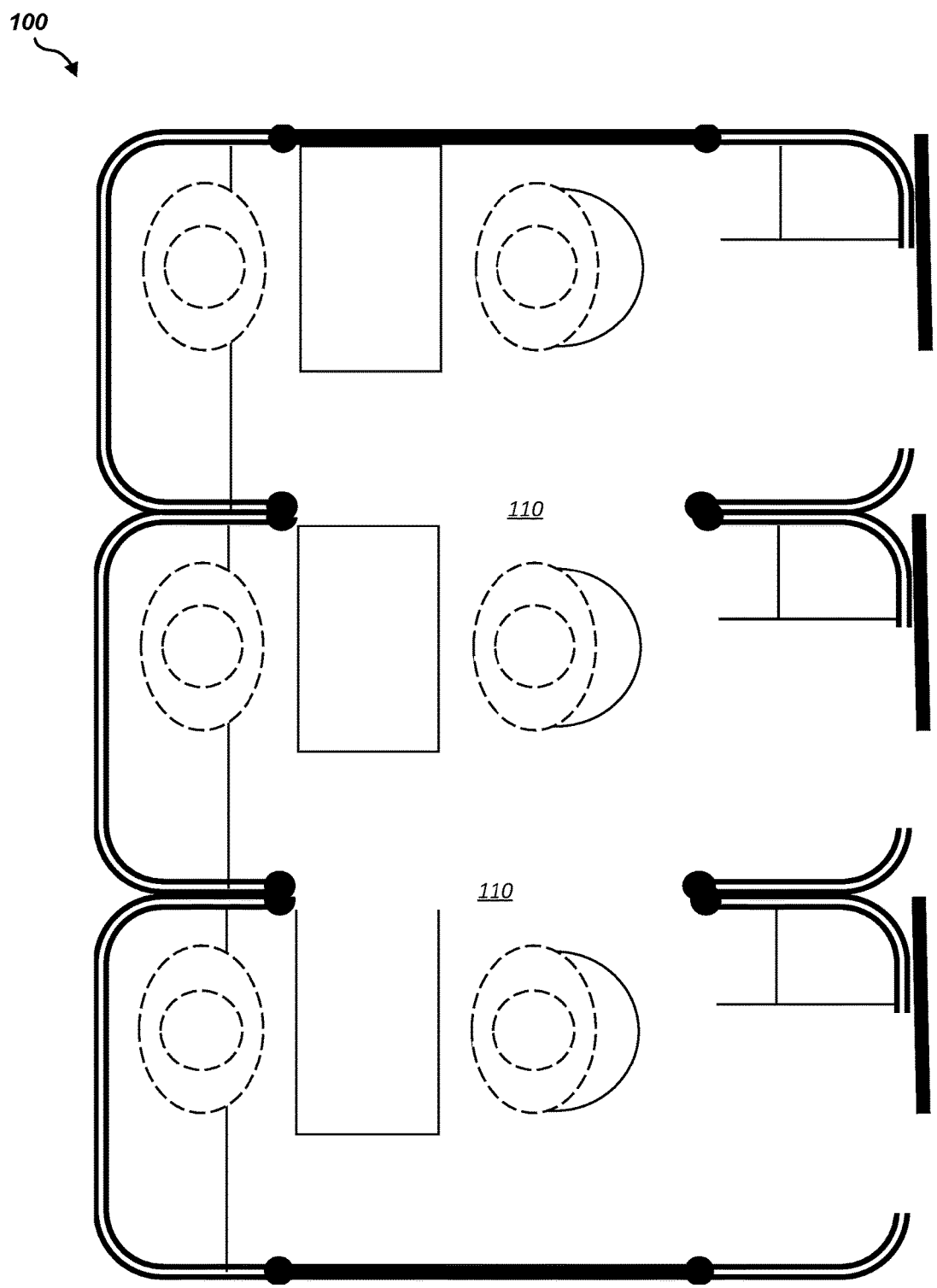
FIG. 1C shows the connection of multiple vehicles from FIGS. 1A and 1B.

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to combining the passenger areas of multiple autonomous vehicles into a single, shared area in order to provide a combined dining experience for the passengers. Various exemplary methods are described for identifying potential matches among vehicles for which dining experiences are underway or planned.

FIGS. 1A and 1B illustrate an autonomous passenger vehicle 100, which includes passenger seating 102a,b and a dining surface 104. The passenger vehicle 100 may include all of the necessary components for a roadable autonomous vehicle, including wheels, a drive train, and an engine. Each seat 102a,b may include a seat belt, harness, or other safety equipment. Surfaces of the vehicle 100 may include air bags and other devices designed to mitigate the impact of a collision.

FIG. 2 is a schematic diagram of an autonomous vehicle 200, the components of which may be associated with any of the designs illustrated in the disclosures herein. The autonomous vehicle 200 may include an engine 202, which may be a combustion engine, an electric engine, or any other motive force appropriate for a vehicle. The engine 202 provides power to a drive train 204, which in turn provides motive power to a drive train 204 to turn the wheels of the vehicle 200. Sensors 206 report on both internal and external conditions of the vehicle, and may include, for example, SONAR and LIDAR sensors as well as cameras, microphones, and other methods of sensing objects and events within and outside the vehicle 200.

A controller 208 enables autonomous navigation of the vehicle 200 as well as managing other adaptations of the modular dining experience as described herein. In some implementations, a vehicle 200 may include a number of controllers associated with different vehicle functions. For instance, one or more processors associated with navigation features may communicate with another processor receiving and recording data associated with the sensors 206 and the engine 202. Other vehicle features that are automated for electronic control may also be in electrical communication with the controller 208.

Communication modules 210 allow the vehicle 200 to send and receive a variety of signals. In some implementations, one or more communication modules may be dedicated to communication between nearby vehicles. A variety of protocols, including both short-range and longer range radio transmissions, may be accommodated by the communication modules 210. In some implementations, communication modules 210 may exchange data with one or more proprietary servers in order to track vehicle telemetry, maintain and update the controller 208, and log user preferences. Communication modules 210 may be utilized to access centralized information for dining experience matching, as further described below.

The vehicle 200 may include doors 212 in a variety of configurations. In some implementations, doors 212 may be specially adapted to allow for the modular connection of multiple vehicles, as further described below. Doors 212 may be configured for manual operation, automatic operation, or both; in some implementations, the doors may automatically lock under conditions when it might not be safe to operate them. Similar features may exist for windows 214, including both the ability to operate them differently when their openings are to be used as a connection point for multiple vehicles, and with context-driven limitations in their operation based on safety parameters.

An autonomous vehicle 200 can include a number of safety systems 216 designed to mitigate injury to passengers in the event of collision. In some implementations, safety systems 216 may be adapted to movable components of the vehicle 200, such as mobile airbag deployment based on passenger positioning, or harnesses that can adapt and extend around passengers and/or objects as needed to secure them.

The autonomous vehicle 200 further includes passenger seating 218, dining surfaces 220, and food preparation 222. Many of the different embodiments described herein are distinguished by the configuration and positioning of these components. Some embodiments do not include any food preparation 222 on each individual vehicle, but rather share a food preparation area amongst vehicles as part of the shared dining experience.

Seating 218 can vary widely in different implementations of the present disclosure. The passenger seating 218 can vary between vehicles and also between positions, and a single vehicle may include removable seats in order to further vary according to passenger preference and/or different uses. Seating 218 may include, for example, stationary or adjustable vehicle seating, theater-style seating, bucket seating, bench seating, inflatable/flexible seating, and the like. Some implementations can also include docking stations for accessibility, such as a wheelchair or other mobility-assistance technology. Seating 218, including different seating configurations described herein, may be replaced by open spacing and/or docking mechanisms to allow for greater accessibility.

Dining surfaces 220 can vary widely in different implementations of the present disclosure. The surfaces 220 may be different in different seating positions, and a single vehicle may include modular surfaces 220 that can be deployed under different conditions or according to passenger preference. In addition to stationary fixtures, eating surfaces can include, for example, moveable tables, foldable tables, expandable tables, tablet-style desk tables, pull-out trays, flip-down trays, or the like. In some implementations, smaller tables may be connected between different modular vehicles to form larger tables to accommodate groups. The height of the surfaces 220 may also vary for different dining experiences and/or passenger preference, or may be variable.

Food preparation 222 may vary widely in different implementations of the present disclosure. In some implementations, the food preparation 222 may be an automated device, which may include generating food from available components (such a 3D printer) as well as vending pre-packaged food. Live food preparation, such as by means of a chef preparing fresh ingredients into a meal in an area of the vehicle set aside of this activity, is also a viable alternative.

To facilitate a modular dining experience, each vehicle 200 includes coupling mechanisms 224 as further described herein, to allow it to connect with one or more other vehicles. The coupling mechanisms may vary widely, and in some implementations, adaptive coupling mechanisms may be used that may allow many different configurations of coupling.

Returning to FIGS. 1A and 1B, a vehicle 100 includes passenger seats 102a and 102b, a dining surface 104, and a food production area 106. A 3D printer in the food production area 106 dispenses food items selected by passengers for dining. The vehicle 100 has a single sliding door 108 and two large windows 110. The dotted lines marked 112 are examples of locations where a passenger might sit during the trip.

FIG. 1C demonstrates a combined dining experience through the connection of multiple vehicles 100. The vehicles are coupled along their longer sides, and the windows 110 on each side where a connected vehicle is present are removed to effectively combine the passenger spaces of the vehicles. While combined, the vehicles 100 can move in tandem. Removal of the windows 110 allows for the diners to communicate face-to-face while still at separate tables, analogous to restaurant booths.

Figure 3C:
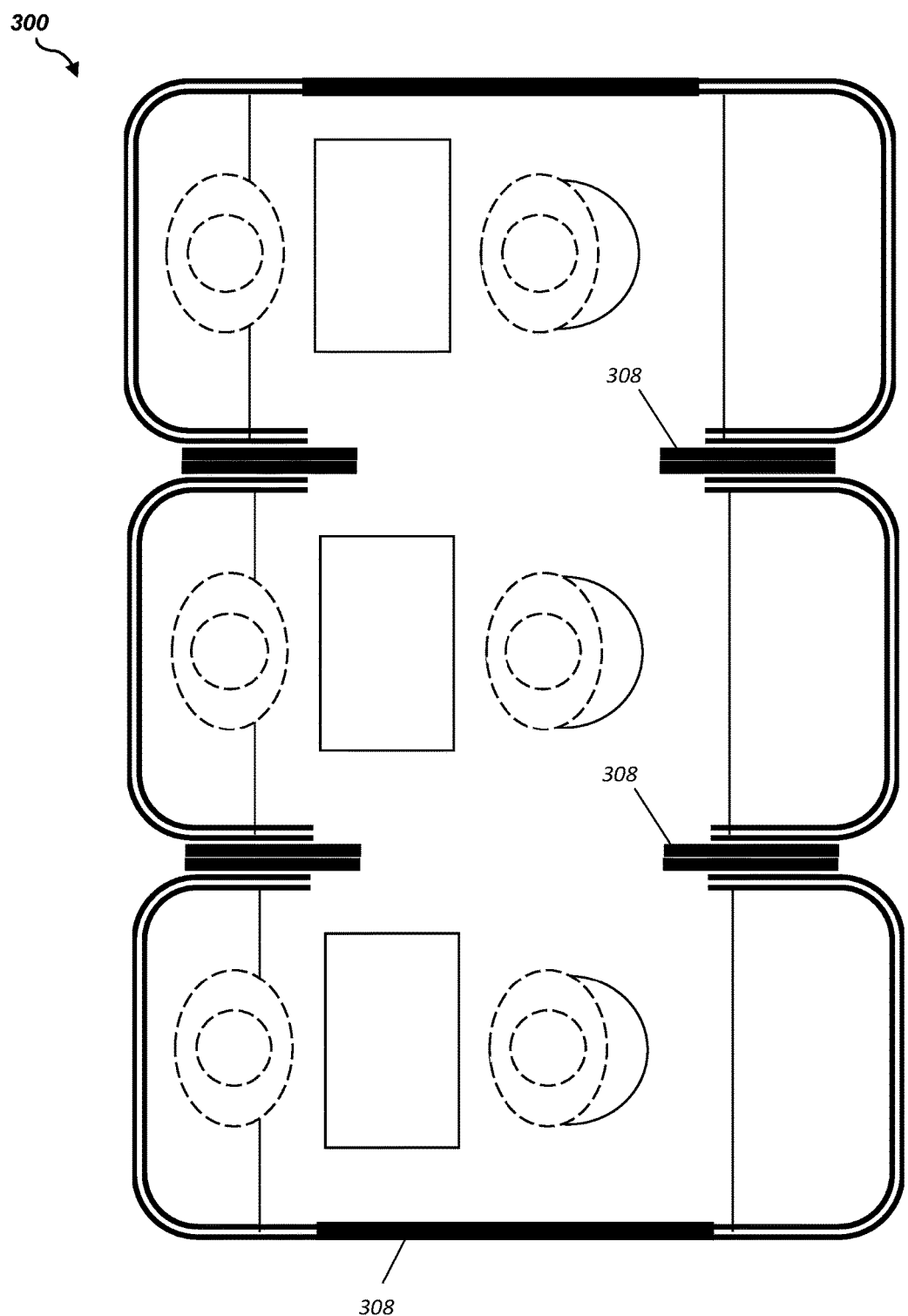
FIG. 3C shows the connection of multiple vehicles from FIGS. 3A and 3B.

FIGS. 3A-3C illustrate modular layout for a vehicle 300 that is similar to that described above with respect to the vehicle 100 but with a few notable differences. A set of sliding doors 308 is located on each of the two longer sides, and the food preparation area 306 takes up the entire short wall opposite the end seat 302*b*. Other placements—particularly the central seat 302*a*, the dining surface 304, and the suggested locations 312 of the passengers, are similar to that described above.

As shown in FIG. 3C, the vehicles 300 can be coupled along their larger sides in order to form of combined dining space from the main passenger space of the vehicles. The doors 312 between vehicles 300 are opened as part of the coupling procedure, while the doors 312 at the front and rear of the combined vehicles may remain closed when not in use.

Figure 4:
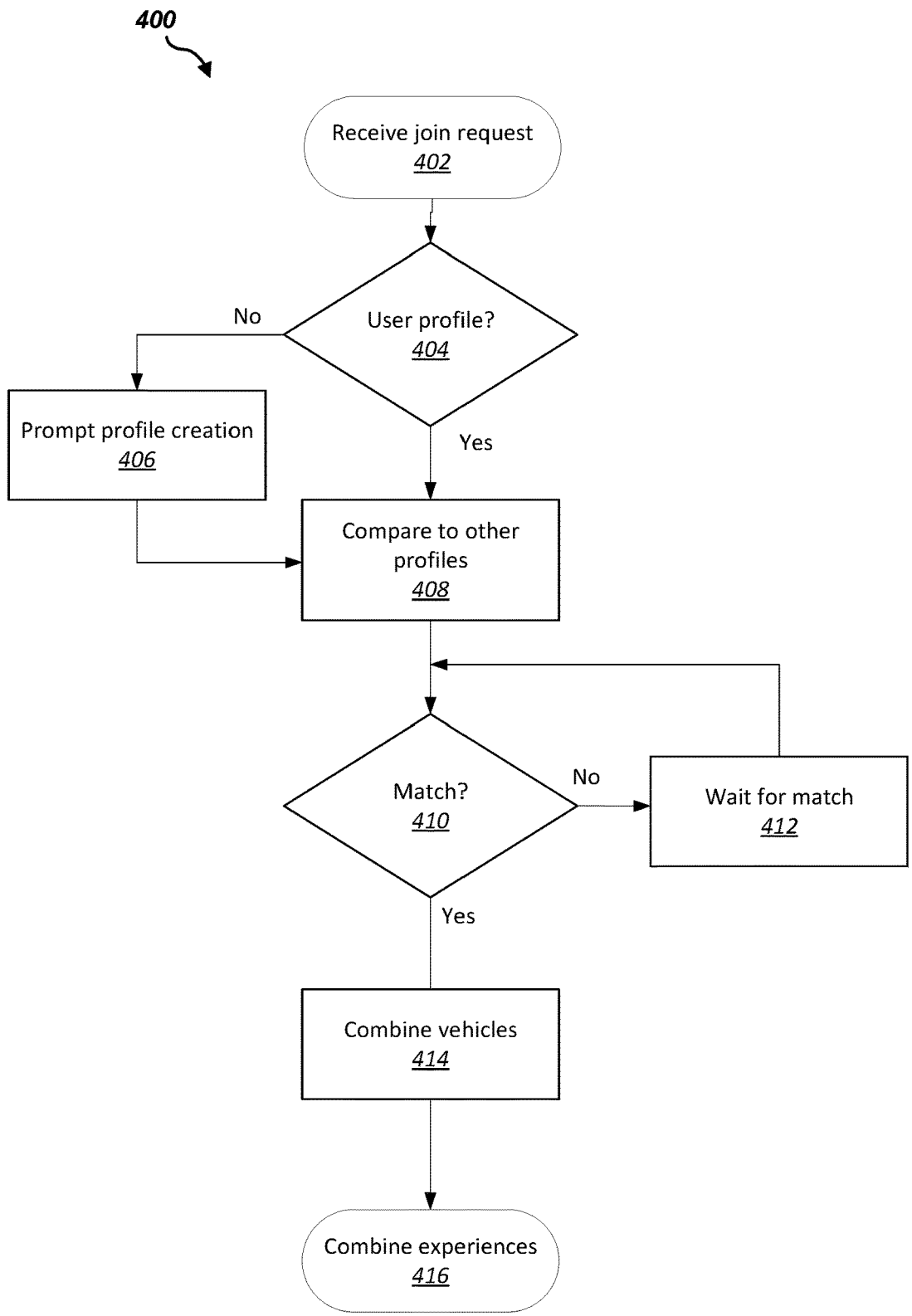
FIG. 4 is a flow diagram illustrating an exemplary method for matching users for a combined dining experience in accordance with one aspect of the present disclosure.

FIG. 4 provides an exemplary process 400 illustrating some of the logic associated with initiating a match between vehicles. In response to receiving a join request from a user (402), the system checks to see if the user already has sufficient information within a user profile to allow for a match (404). If not, the user may be prompted to create such a profile before continuing (406). In some implementations, the system may allow an unknown user who does not wish to create a profile to match anyway, but their matches may be limited to those who are comfortable being matched generically with anyone. Some implementations may allow users to optionally restrict their matches based on food preferences, entertainment preferences, demographic information, conversation topics, and the like; users without any profile might be excluded from being matched with such selective preferences.

The system then compares the user's profile to other profiles which are available to match (408). In some implementations, the compared profiles may be restricted to other users of the system already seeking a similar experience (that is, those waiting per step 412 as described below) or who are already participating in a dining experience. As illustrated, more than two vehicles may be joined together in some embodiments, and so it is possible that a match for a new user may be found by joining a dining experience already in progress.

If a match is not found ("no" branch of step 410), then the system may inform the user and wait for a set interval to see if an appropriate match becomes available (412). In some implementations, the wait may be limited to a set interval of time, or may be sustained until ended voluntarily by the user. The wait may, in some implementations, not include postponing the food preparation process. A user may select food items that are prepared and served to the user even while the system waits to find the user a match.

Once a match is found, the vehicles associated with each of the users are combined together (414) to create a common space where the users can dine. Various layouts of autonomous vehicles are described herein, which allow for different configurations and mechanisms of shared space.

With the physical elements joined, the dining experience itself can also be combined (416). In some implementations, this may include a selection of entertainment (such as music) that matches the preferences of all users. Food may, in some implementations, also be selected after the users have been matched, and may be selected by a menu that combines the user preferences.

Figure 5:
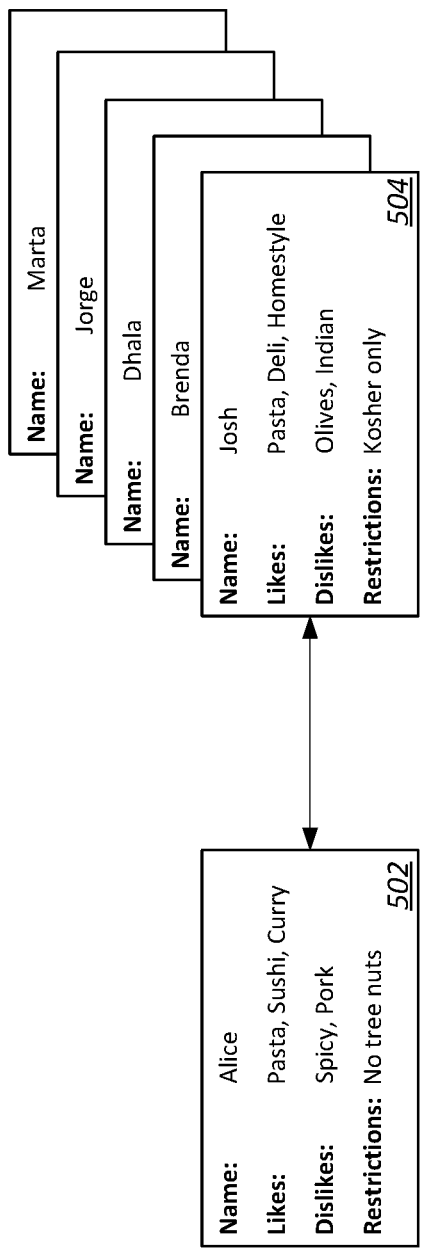
FIG. 5 is an illustration of a profile matching process in accordance with one aspect of the disclosure.

FIG. 5 illustrates an example of a matching process among user profiles. Here, Alice's user profile 502 is matched with Josh's profile 504 over that of several other available profiles, based on an estimated compatibility of their likes and needs. In some implementations, a menu may then be provided to Alice and Josh that excludes tree nuts and non-kosher foods, and that emphasizes non-spicy pasta dishes as representing shared culinary preferences.

A large variety of parameters may be considered when determining matches for a shared dining experience. Such parameters can include: vehicle routing, food preference, entertainment preference, demographic preference, and personal connection. Any other parameters known in the art may be used; in some implementations, the consideration and weighting of different preferences may depend broadly on settings that can be adjusted by each user.

Vehicle Routing.

The relative location of modular vehicles may affect which vehicles can be matched together to provide a combined dining experience. In some implementations, the planned route of each vehicle may be uploaded to a central server. The compatibility of different routes may depend on, for example, the general direction of each route as well as the proximity of some or all of the points along the route.

Different users, as well as different implementations of the disclosure, may permit different degrees of flexibility in the relative routing of vehicles. For example, a particular user's itinerary might reflect a route expected to take 30 minutes to traverse, but the user may have permitted 90 minutes in the vehicle to allow for a leisurely mobile dining experience. It would then be possible for the vehicle to park, backtrack, and even depart from the route entirely for as much as an hour in order to share a dining experience with other vehicles having tighter constraints.

In some implementations, the time or distance constraints of a route may be determined indirectly through the logic of an automated system. For example, if the system includes calendar event data for a user that matches a user's selected destination, the system may infer that the user needs to arrive at the destination in time to make the event. As another example, if a user's history shows a habitual time of arriving at an office or home, the system can infer a constraint on the user's route to match the habitual time or location.

Where time and distance constraints are included in matching, the constraints may also include corresponding aspects to the dining experience. For example, entertainment can be planned to end a set amount of time prior to the vehicle arriving at a destination. The system may also provide warnings to each user at an amount of time (for example, fifteen minutes) prior to when that user would depart the vehicle. The user could be expected to use that time to prepare for departure, such as collecting and packaging any leftovers from the meal, donning outerwear, and exchanging friendly goodbyes with dining companions.

Food Preferences—Order Before Match.

In some instances, a user may select food items prior to being matched for a combined dining experience. This may be the default or only option for some implementations; in other implementations, a user may be able to select between this and a match-first process (as described below). The user's food preferences may be based, for instance, on the availability of items in their food preparation area. In some implementations, different vehicles may have food preparation areas with different menu selections, and users may choose or be directed to particular vehicles that match their preferences.

When the user selects food before they are matched for a combined dining experience, the system may take particular food selections into account when matching users. For instance, a user with a restriction for vegetarian-only dining might be matched with someone who is not always vegetarian according to their general preferences, but has chosen a vegetarian option for their meal. In this manner, restrictions on food preferences that might make some diners incompatible in the abstract might not pose a barrier in practice when the actual food ordered is not among the incompatible preferences.

Food Preferences—Match Before Order.

The system can also be configured (either as the only option or a user's choice) to match users based at least in part on general food preferences, allowing the ordering to be part of the combined dining experience. In some implementations, where different food preparation areas provide different menu selections, the matching may be based not only on shared food preferences, but also on maximizing the diversity of menu options available.

When the users select food after they are matched and connected for a combined dining experience, the available food preferences may be tailored to the users' shared preferences. For instance, if one of the matched users has a strong preference or requirement for vegetarian-only dining, all of the options provided for all users (even those who are not themselves vegetarians) may be meatless. Food allergies and other requirements among the users may be similarly restricted.

In some implementations, where a user's requirements or preferences might significantly curtail the menu choices of another user, the impacted user might be informed of this and provided with the option to either permit or reject the match. For example, a meat-eating user might be told that a vegetarian user has been matched to them, and could choose to accept the match (and be restricted to vegetarian menu options) or reject the match (and forgo a combined dining experience under this constraint).

Entertainment Preferences.

A shared dining space may include music, a movie, or other entertainment. In some implementations, shared entertainment preferences may be one of the factors used to determine a match. As with other factors, the system may include user history (that is, a record of media watched and/or listened to) instead of, or in addition to, preferences explicitly stated by the user.

Where a particular entertainment selection has an associated cost—such as, for example, a premium movie available for rent during the dining experience—one incentive for combining a dining experience may be sharing this cost. In some implementations, a group of users may pay less individually to watch a movie in a combined compartment than if they had each watched the movie in separate vehicles. Any other premium or live entertainment option may provide similar user incentive for a combined experience.

User preferences for comfort could also be included in these considerations. For example, a preferred light level, air temperature, or modular seating arrangement could each be known to the system (either through explicit input in profile or from user history) and matched as closely as possible to ensure an ideal dining experience for each user.

Demographic Preferences.

Certain users may prefer social dining experience including or lacking certain elements. For example, a young adult couple may prefer to dine with one or more other young couples. Families with children, single adults, older adults, and the like may each prefer dining partners within certain age and lifestyle parameters.

Other cultural factors may also be included in these preference calculations, including language. For example, two or more vehicles with Spanish-speaking users could combine for an experience where they can communicate in Spanish. Other elements of the dining experience, such as the menus and entertainment, could also be in Spanish. Such an option could be made available for those who wish a novel dining experience even if they are not fluent speakers—for example, an English-speaking user expressing interest in Latin American menu options might also be invited to join a Spanish language combined dining experience.

Personal Connection.

In general, the system may not provide specific information about users when matching them. Navigating vehicles together and connecting them may be done automatically, and the identity of other diners may be determined only by what users choose to share in person. However, in some implementations, users may be informed when the system identifies an existing personal connection with a potential match.

For example, the match server may have access to social media data that includes a connection (such as "friends") between two users that are a candidate match. In some implementations, this may be used as an additional factor to weigh in determining the match; in other implementations it may prompt a user alert asking if the friend is a preferred connection.

In addition to this automated recognition of personal connections, a user's premeditated use of a connection may also be made available in some implementations of the disclosure. A user may, upon requesting to be joined for a combined dining experience, specify another user on the system with whom they explicitly intend to connect. The system may seek approval of the other user; this may override the normal match process and instead match the requesting users immediately. A requested personal connection match may also be either "open" or "closed," indicating whether the users within this experience wish to permit additional unplanned matches to be added as well.

Figure 6C:
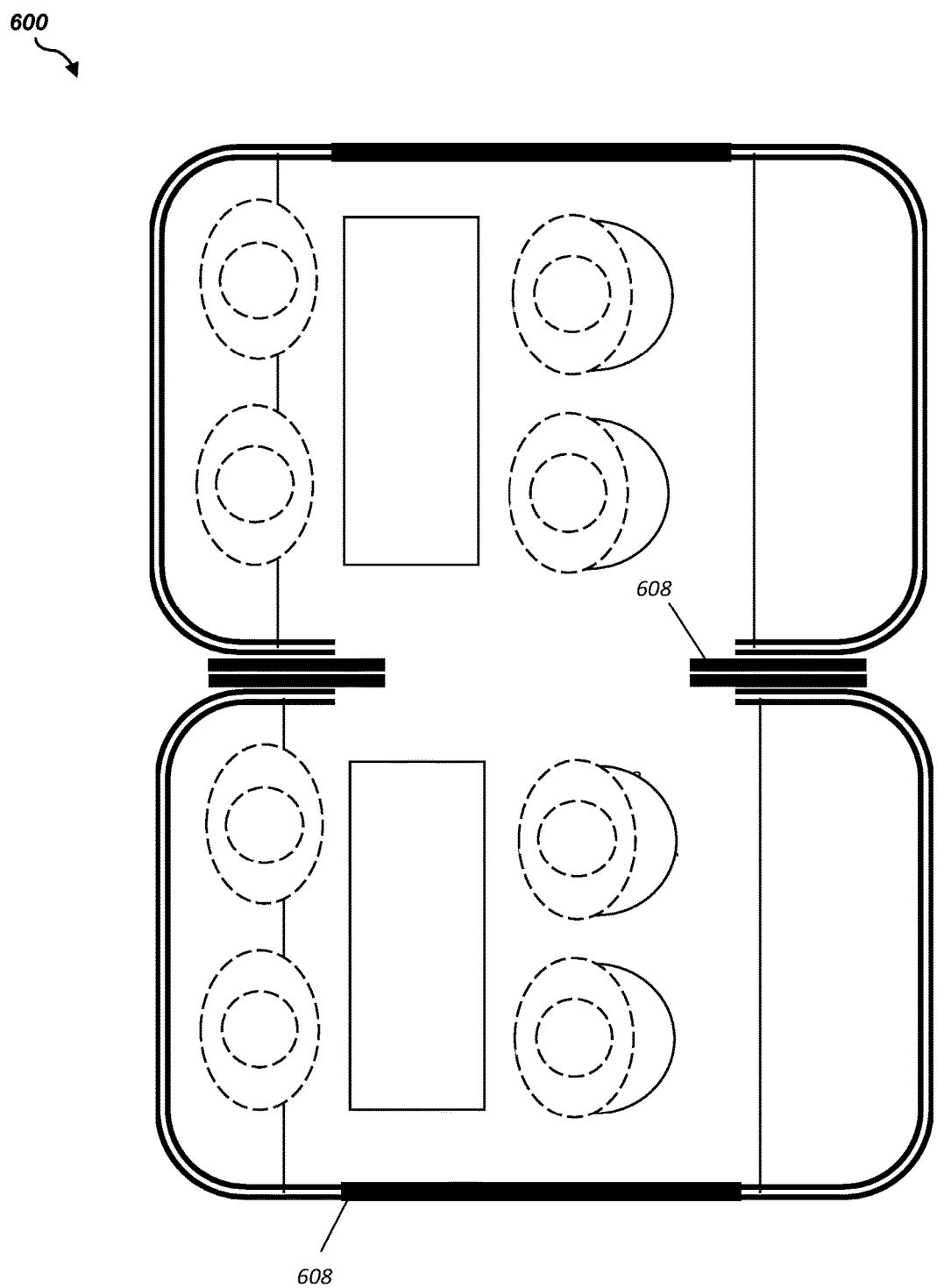
FIG. 6C shows the connection of multiple vehicles from FIGS. 6A and 6B.

Additional variations of vehicle shape, size, and configurations are provided in the following figures. FIGS. 6A-C show a wider vehicle 600 including standalone seat 602*a* and bench seat 602*b* as above, but the longer seat 602*b* and additional standalone seat 602*c* facilitate up to four passengers in the vehicle, as illustrated by the broken lines 612. The dining surface 604 are food production area 606 are correspondingly larger. In some implementations, the larger vehicle may allow for additional options to be provided, such as a board game as an entertainment option associated with the surface 604, or a greater variety of food options associated with the production area 606. The area 606 may, in some implementations, be sufficient to host a live chef.

Figure 7:
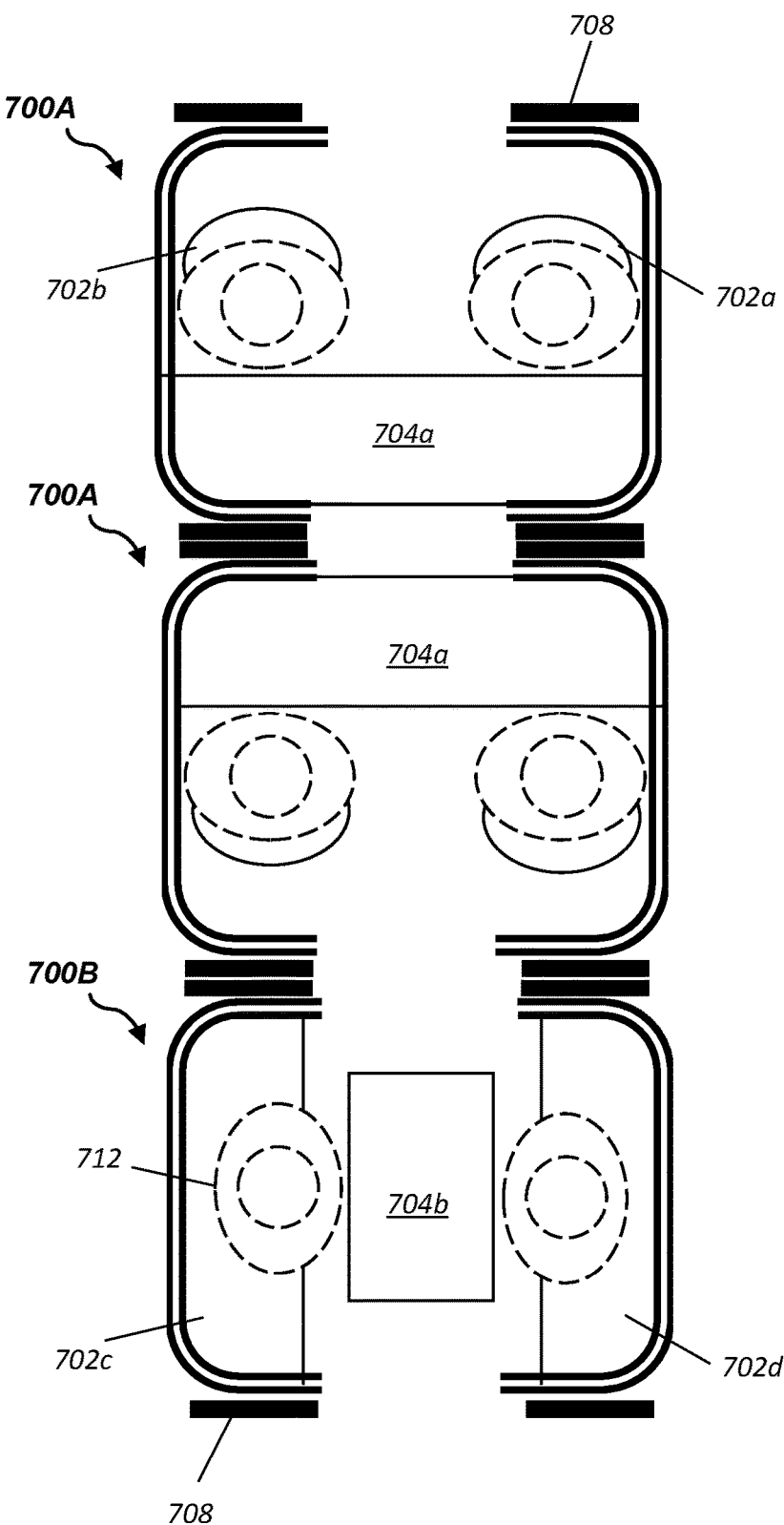
FIG. 7 shows a plan view of the connection of multiple vehicles each having one of two different configurations, in accordance with one aspect of the disclosure.

FIG. 7 shows a connection between two different configurations of vehicle 700A and 700B. A first modular vehicle layout 700A includes two standalone seats 702a,b facing the same dining surface 704a which is along a sliding door 708 (or in, an alternate embodiment, a retracting window). Two of this vehicle type 700A can be positioned for connection at the surface along which the dining surface 704a sits. A second modular vehicle layout 700B includes side seating benches 702c,d with a dining surface 704b positioned between them. Multiples of either or both of the vehicle types can be connected together, and may be oriented in different relative directions.

Figure 8:
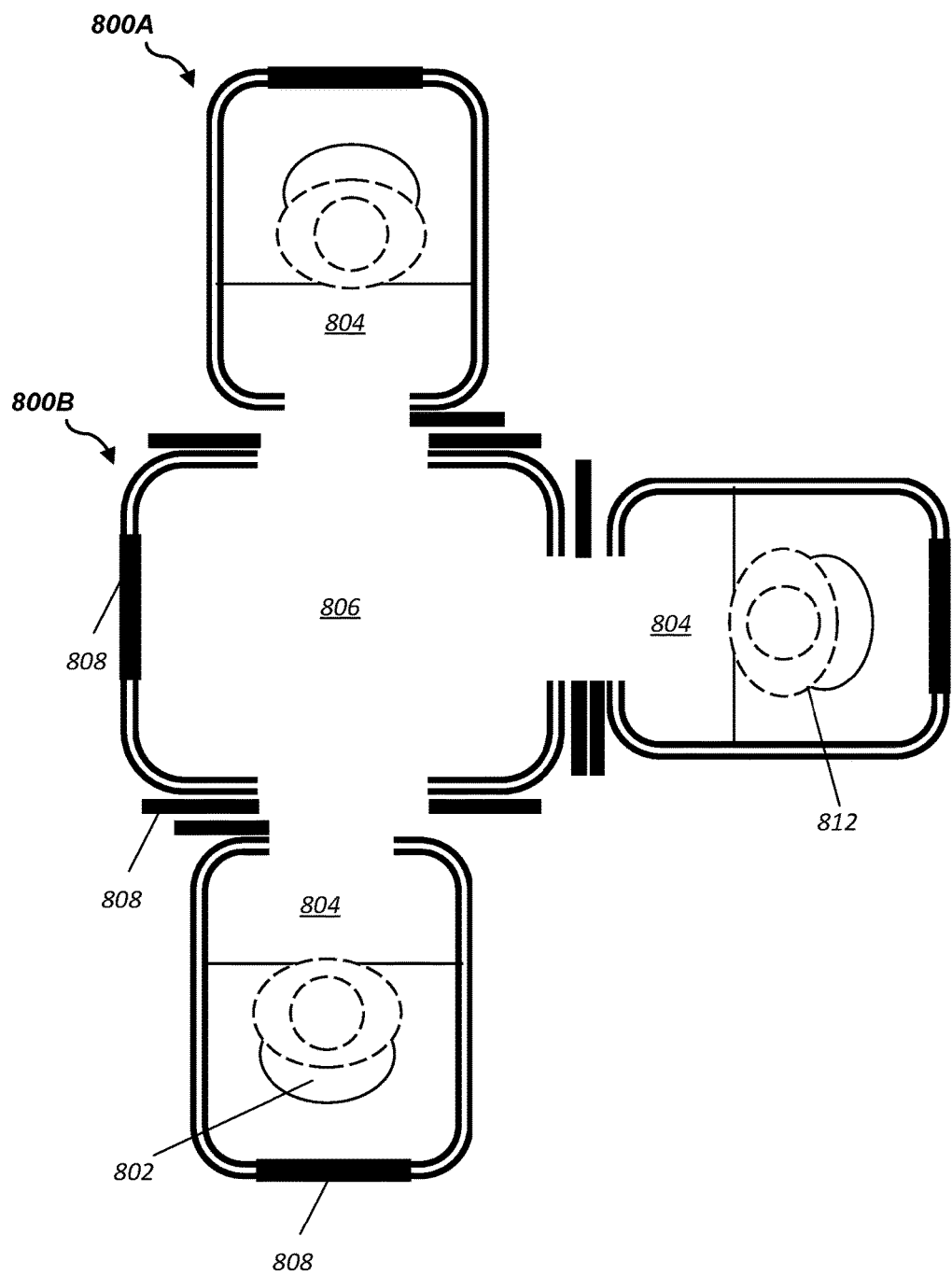
FIG. 8 shows a plan view of the connection of multiple modular vehicles to a central food service hub vehicle in accordance with one aspect of the disclosure.

FIG. 8 shows a connection between modular passenger vehicles 800A and a central food service vehicle 800B. The food service vehicle 800B includes a food preparation area 806, which as described may include live food service, vending, and/or 3D food printing apparatus. The central vehicle 800B may also act as a hub for other functions, such as entertainment. As shown, each passenger vehicle 800A includes a standalone seat 802, a dining surface 804, and sliding doors 808. A passenger can be positioned as shown by the dotted lines 812. A fourth sliding door 808 in the food service vehicle 800B could also be made available to a fourth mobile passenger vehicle, or may be left free for entrance and egress to the food service vehicle.

In some implementations, modular mobile vehicles may park while connecting to form a modular dining experience. This may facilitate more flexible arrangements for vehicles as the combination does not need to be roadable, but it may limit the time and availability of partners to those who can afford to halt their travel.

Figure 9:
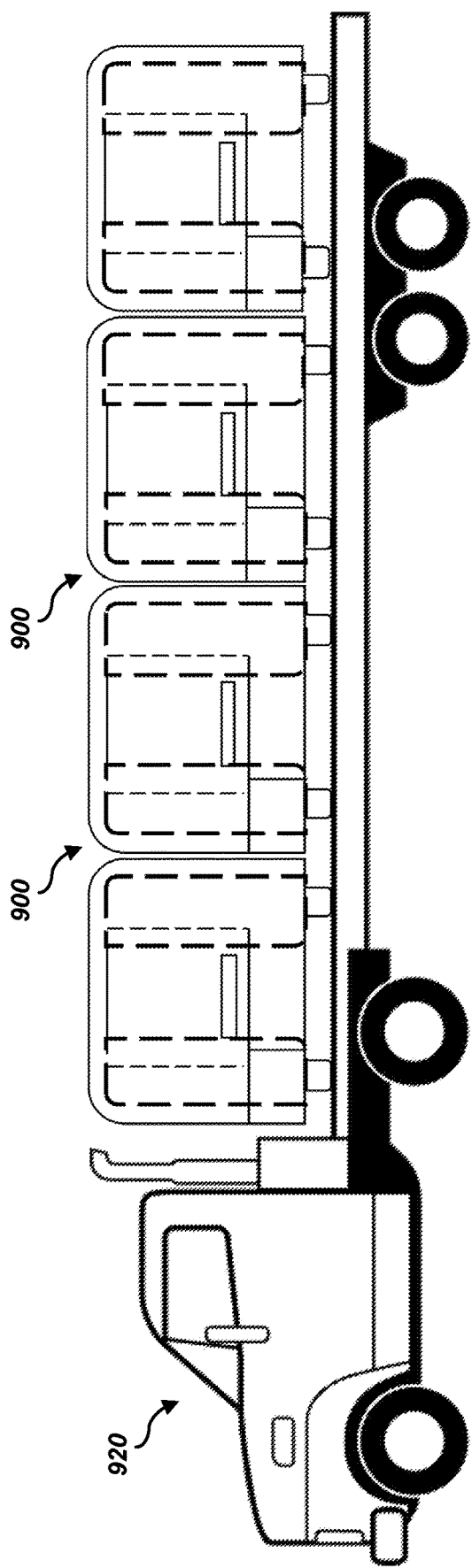
FIG. 9 shows a tractor-trailer vehicle carrying multiple connected modular vehicles in accordance with one aspect of the disclosure.

FIG. 9 shows an alternative that alleviates time pressure by parking the modular vehicles 900 on the bed of a tractor-trailer 920. This allows the connected vehicles to continue to move on the roads while not limiting the vehicle connections themselves to roadable configurations. In some implementations, the cost and availability of a truck bed as part of the combined dining experience may be an additional factor considered during the matching process; it may instead be something selected by users in advance.

Figure 10:
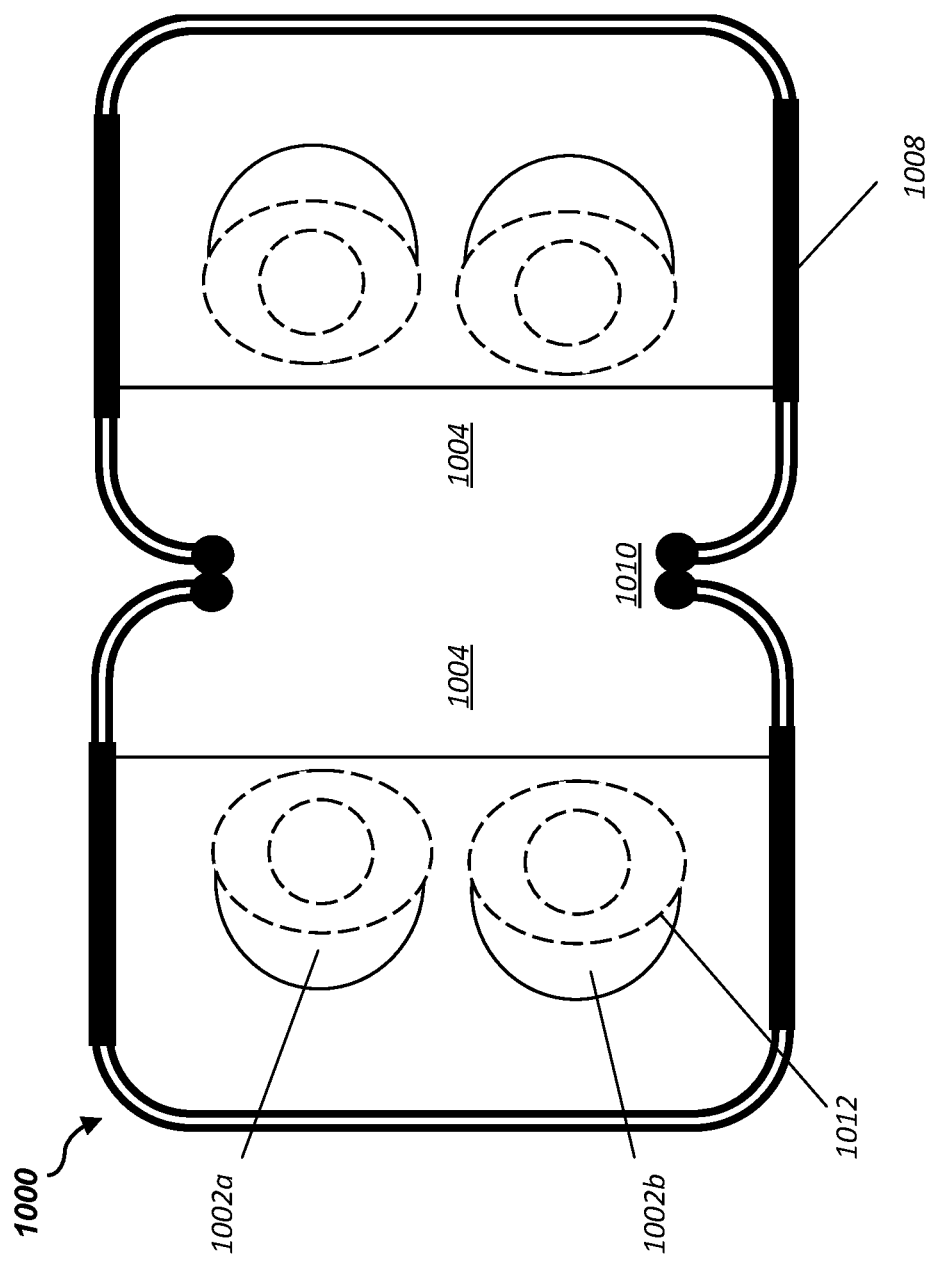
FIG. 10 shows a plan view of the connection of two modular vehicles in accordance with on aspect of the disclosure.

FIG. 10 shows the connection of two vehicles 1000 at a large window 1010 along one side. The seats 1002a,b are positioned facing the dining surface 1004 and window 1010 such that, when connecting to another vehicle 1000, the users (approximately positioned according to the dotted lines 1012) can face each other. The eating surfaces 1004 of the vehicles may also connect in some embodiments to form a common eating surface. Doors 1008 are available on either shorter end.

Figure 11:
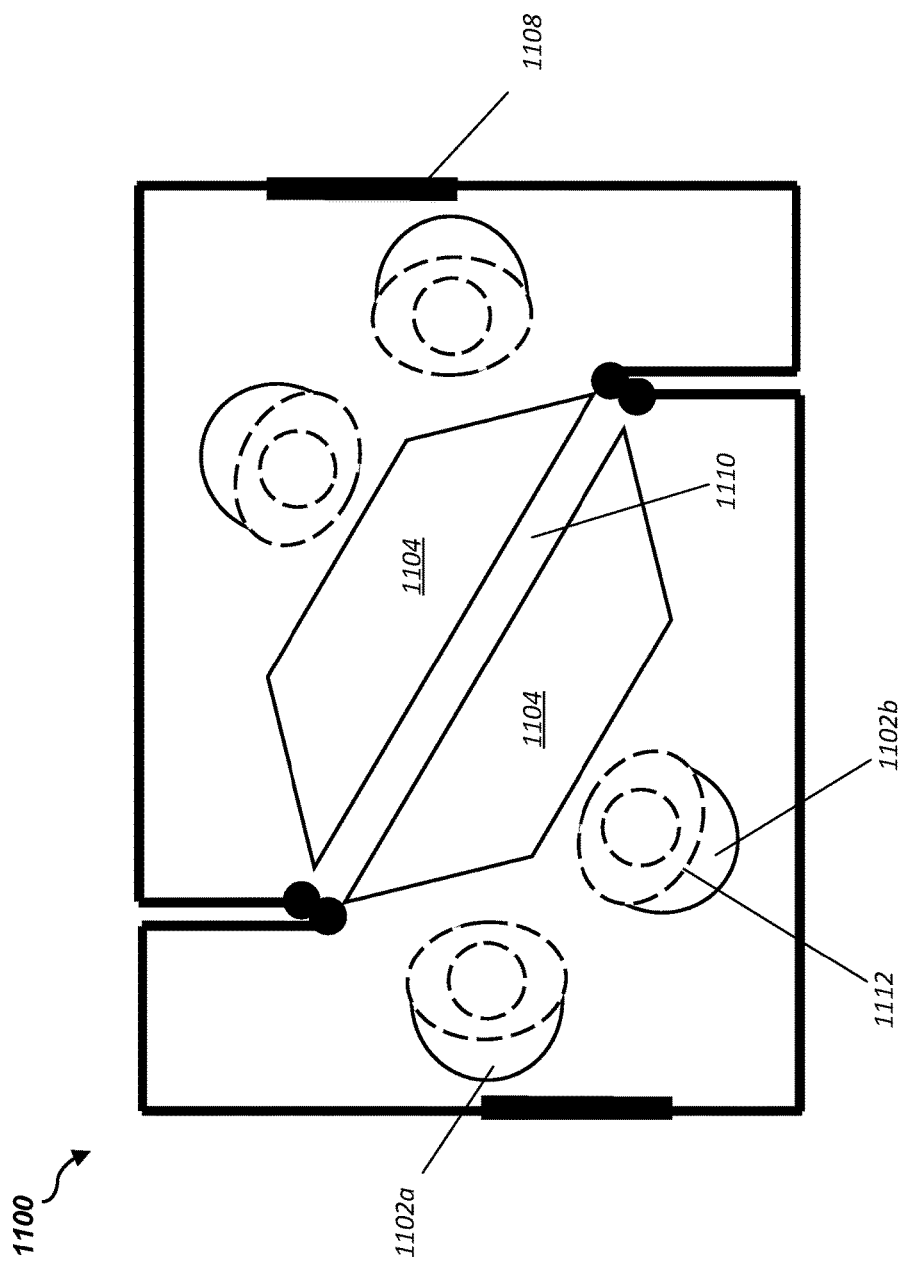
FIG. 11 shows a plan view of the connection of two modular vehicles in accordance with on aspect of the disclosure.

FIG. 11 shows another configuration for an autonomous modular vehicle 1100 combined with another. The vehicle in this configuration may run on three wheels, and is shaped to increase the shared window 1110 of the space so as to more intimately connect the users within the combined dining experience. In addition to an exterior connection, one of ordinary skill will recognize mechanical linking mechanisms by which the dining surfaces 1104 of the two vehicles 1100 can be combined. Users, positioned according to the broken lines 1112, may sit in standalone seats 1102a and 1102b.

FIG. 12 illustrated another example of modular passenger vehicles 1200A connected to form a combined dining experience with a separate food service vehicle 1200B. As shown, the food service vehicle 1200B may move dependently from the passenger vehicles 1200A, which may be elevated off the ground for a sufficient length of time to allow the movement of the service vehicle 1200B from connecting with one passenger vehicle to another. Various of the configurations of passenger vehicle disclosed above could be utilized in conjunction with this moving food service vehicle.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method comprising:
identifying a first autonomous vehicle including a first dining experience, wherein the first autonomous vehicle comprises a set of sliding doors located on both a first and second longer side of the first autonomous vehicle;
identifying a second autonomous vehicle including a second dining experience, wherein the second autonomous vehicle comprises a set of sliding doors located on both a first and second longer side of the second autonomous vehicle; and
coupling the first and second autonomous vehicles to combine the first and second dining experiences, wherein the first longer side of the first autonomous vehicle is attached to the second longer side of the second autonomous vehicle with the sliding door of the first longer side of the first autonomous vehicle and the sliding door of the second longer side of the second autonomous vehicle opened automatically when coupled.

2. The method of claim 1, wherein identifying the first and second autonomous vehicles comprises determining the compatibility of the first dining experience with the second dining experience.

3. The method of claim 2, wherein determining the compatibility of the dining experiences includes comparing a start time or end time of the first dining experience with a start time or end time of the second dining experience.

4. The method of claim 3, wherein the start times of the first and second dining experiences are within a predetermined range.

5. A mobile modular dining system, comprising:
a first autonomous vehicle comprising a first passenger dining compartment, wherein the first autonomous vehicle comprises a set of sliding doors located on both a first and second longer side of the first autonomous vehicle; and
a second autonomous vehicle comprising a second passenger dining compartment, wherein the second autonomous vehicle comprises a set of sliding doors located on both a first and second longer side of the second autonomous vehicle;
wherein the first and second autonomous vehicles are configured to connect to form a combined passenger dining compartment from the first and second passenger dining compartments, wherein the first longer side of the first autonomous vehicle is attached to the second longer side of the second autonomous vehicle with the sliding door of the first longer side of the first autonomous vehicle and the sliding door of the second longer side of the second autonomous vehicle opened automatically when coupled.

6. The system of claim 5, further comprising a third autonomous vehicle having a third dining compartment, wherein the third autonomous vehicle is configured to connect to form a larger combined passenger dining compartment with the first, second, and third passenger dining compartments.

7. The system of claim 6, wherein the third autonomous vehicle comprises a set of sliding doors located on both a first and second longer side of the third autonomous vehicle with the first longer side of the third autonomous vehicle attached to the first longer side of the second autonomous vehicle, the sliding door of the first longer side of the third autonomous vehicle and the sliding door of the first longer side of the second autonomous vehicle opened automatically when coupled.

8. The system of claim 7, wherein the sliding door of the second longer side of the third autonomous vehicle remains closed.

9. The system of claim 5, further comprising a fourth autonomous vehicle having a food preparation area, wherein the fourth autonomous vehicle is configured to connect to join the food preparation area with the combined passenger dining compartment.

10. The system of claim 5, wherein the sliding door of the second longer side of the first autonomous vehicle remains closed and the sliding door of the first longer side of the second autonomous vehicle remains closed when coupled.

* * * * *